United States Patent
Yutani et al.

(10) Patent No.: US 10,443,745 B2
(45) Date of Patent: Oct. 15, 2019

(54) VALVE DEVICE

(71) Applicant: DENSO CORPORATION, Kariya, Aichi-pref. (JP)

(72) Inventors: Kentaro Yutani, Nishio (JP); Takumi Kataoka, Nishio (JP); Naohito Seko, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/551,336

(22) PCT Filed: Mar. 24, 2016

(86) PCT No.: PCT/JP2016/001718
§ 371 (c)(1),
(2) Date: Aug. 16, 2017

(87) PCT Pub. No.: WO2016/163096
PCT Pub. Date: Oct. 13, 2016

(65) Prior Publication Data
US 2018/0031132 A1 Feb. 1, 2018

(30) Foreign Application Priority Data

Apr. 6, 2015 (JP) .................... 2015-077874
Mar. 17, 2016 (JP) .................... 2016-053310

(51) Int. Cl.
*F16K 5/20* (2006.01)
*F16K 5/06* (2006.01)
*F16K 37/00* (2006.01)

(52) U.S. Cl.
CPC ............ *F16K 5/202* (2013.01); *F16K 5/0605* (2013.01); *F16K 5/0689* (2013.01); *F16K 5/201* (2013.01);
(Continued)

(58) Field of Classification Search
CPC .......... F16K 5/201; F16K 5/204; F16K 5/205; F16K 5/0673; F16K 5/0678;
(Continued)

(56) References Cited

U.S. PATENT DOCUMENTS 4,883,253 A * 11/1989 Hashimoto ........... F16K 5/0668
251/315.01
5,205,533 A * 4/1993 Berchem ............... F16K 5/0605
137/375
(Continued)

FOREIGN PATENT DOCUMENTS

DE 2457226 A1 * 6/1975 .......... F16K 5/0605
DE 10 2009 014 047 9/2010
JP 9-178004 A 7/1997

OTHER PUBLICATIONS

International Search Report for PCT/JP2016/001718, dated Jun. 28, 2016, 2 pages.

*Primary Examiner* — Reinaldo Sanchez-Medina
*Assistant Examiner* — Hailey K. Do
(74) *Attorney, Agent, or Firm* — Nixon & Vanderhye P.C.

(57) ABSTRACT

A valve device includes: a valve having a ball surface having a convex spherical shape, and a first opening opened in the ball surface to allow fluid to pass through; and a seat having an annular shape and opposing the ball surface to be in sliding contact, the seat being pressed against the ball surface, the seat having a second opening to communicate with the first opening. The seat has a sealing surface in a sliding contact with the ball surface at a valve closed time when the ball surface and the second opening overlap with each other, and a seat contact surface in a sliding contact with an opening inner wall surface or an opening end surface of the first opening at a valve opened time when the first opening and the second opening overlap with each other.

11 Claims, 12 Drawing Sheets

(52) U.S. Cl.
CPC ........ *F16K 37/0041* (2013.01); *F16K 5/0668* (2013.01); *F16K 5/0678* (2013.01)

(58) Field of Classification Search
CPC .... F16K 5/0689; F16K 5/0684; F16K 5/0605; F16K 5/0207; F16K 5/0271; F16K 5/167; F16K 5/161; F16K 5/0407; F16K 5/0471; F16K 5/181; F16K 5/184; F16K 5/188
See application file for complete search history.

(56) References Cited

U.S. PATENT DOCUMENTS

| | | | |
|---|---|---|---|
| 5,413,310 A * | 5/1995 | Horvei | E21B 34/04 251/159 |
| 2012/0012680 A1 | 1/2012 | Adachi et al. | |
| 2017/0009894 A1 | 1/2017 | Seko et al. | |

\* cited by examiner (a)

(b)

VALVE DEVICE

CROSS REFERENCE TO RELATED APPLICATION

This application is the U.S. national phase of International Application No. PCT/JP2016/001718 filed Mar. 24, 2016 which designated the U.S. and claims priority to Japanese Patent Application No. 2015-77874 filed on Apr. 6, 2015 and Japanese Patent Application No. 2016-53310 filed on Mar. 17, 2016, the entire contents of each of which are hereby incorporated herein by reference.

TECHNICAL FIELD

The present disclosure relates to a valve device.

BACKGROUND ART

A conventional valve device is known, which includes an annular valve seat elastically supported by a casing, a ball valve having a ball surface shaped in a convex sphere surface in sliding contact with a sealing surface of the valve seat, and an elastic component which biases the valve seat against the ball surface of the ball valve (for example, Patent Literature 1).

The valve device controls the communication state between a first opening of the valve seat and a second opening of the ball valve by rotating the ball valve with a drive unit, so as to control the opening-and-closing operation of the ball valve.

However, in the conventional valve device, since the sealing surface of the valve seat and the ball surface of the ball valve are always in sliding contact to open and close, the sealing surface is worn out, such that the contact surface between the sealing surface and the ball surface increases. For this reason, the contact surface pressure of the sealing surface relative to the ball valve falls, and fluid may leak easily. In other words, the sealing performance for the fluid at the valve closed time of the ball valve cannot be secured over a long period of time.

Therefore, a valve device is required to achieve both of improvement in wear-resistant of the sealing surface of the seat and improvement in reliability of restricting fluid leak while the seat is pressed against the valve by the biasing force of the elastic component.

PRIOR ART LITERATURES

Patent Literature

Patent Literature 1: DE 102009014047 A1

SUMMARY OF INVENTION

The present disclosure is aimed to provide a valve device which can achieve both of improvement in wear-resistant of a sealing surface of a seat and improvement in reliability of restricting fluid leak.

According to an aspect of the present disclosure, a valve device performs at least opening and closing operation by both-way moving (hereafter, may be called as rotating) a valve in a rotational direction. The valve has a ball surface shaped in a convex spherical surface, and a first opening. The ball surface shaped in the convex spherical surface protrudes outward in a radial direction with a center corresponding to a predetermined rotation axis. The first opening of the valve is opened in the ball surface to allow fluid to pass through. The valve device has a seat having an annular shape and opposing the ball surface to be in sliding contact. The seat is pressed against the ball surface, and has a second opening capable of communicating with the first opening. The seat which is pressed against the valve has a sealing surface and a seat contact surface. The sealing surface is in sliding contact with the ball surface at a valve closed time when the ball surface and the second opening overlap with each other. The seat contact surface is in sliding contact with an opening inner wall surface or an opening end surface of the first opening at a valve opened time when the first opening and the second opening overlap with each other.

Thus, wear of the sealing surface of the seat can be reduced by separating the sealing surface in sliding contact with the ball surface at the valve closed time from the seat contact surface in sliding contact with the opening inner wall surface or the opening end surface of the first opening at the valve opened time. Thereby, fluid hardly leaks between the sealing surface and the ball surface, such that the seal performance for the fluid at the valve closed time can be secured for a long period of time. Therefore, both of improvement in wear-resistant of the sealing surface of the seat and improvement in reliability of restricting fluid leak can be achieved.

DESCRIPTION OF EMBODIMENTS

[First Embodiment]

FIG. 1 through FIG. 7 illustrate a valve device according to a first embodiment.

The valve device of this embodiment is a ball type rotary valve device mounted in a vehicle, and includes a spring 3 which elastically presses a valve seat 2 against a ball valve 1. The valve device rotates the ball valve 1 to perform a flow control (open/close a passage and control the opening degree) or distribution control (switch the passage) of the engine cooling water (hereafter referred to cooling water) which is an example of fluid.

The valve device has one cooling-water inlet (inlet) and one or more (such as two or three) cooling-water outlets (outlet). In case where plural cooling-water outlets are provided, the cooling-water outlets have the same basic structure. Hereafter, an opening-and-closing part which is communicated to one cooling-water outlet is explained as an example. The valve device has a casing, and an electric actuator in addition to the spring 3, the ball valve 1 shaped in multiple-surface sphere and the valve seat 2 shaped in ring.

Figure 1:
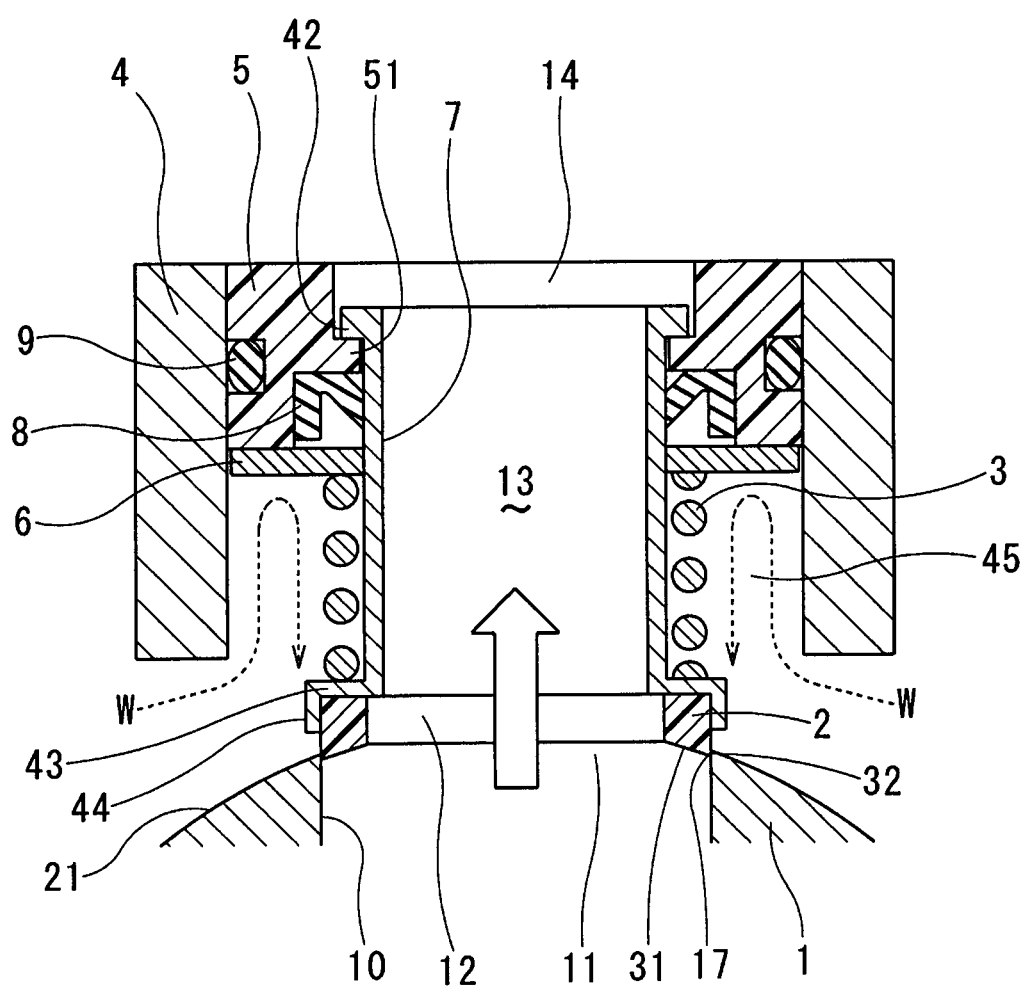
FIG. 1 is a sectional view illustrating a valve device at a valve opened time (according to a first embodiment).
Figure 2:
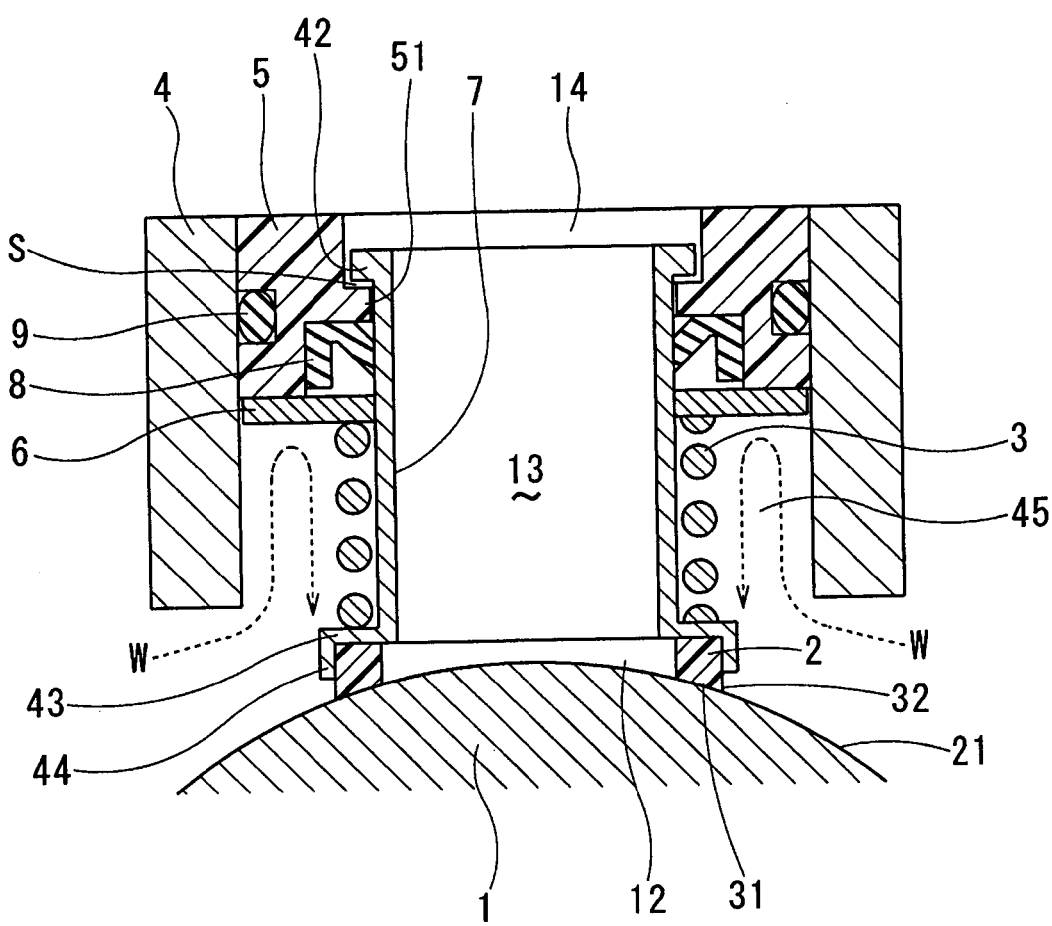
FIG. 2 is a sectional view illustrating the valve device at a valve closed time (according to the first embodiment).
Figure 3:
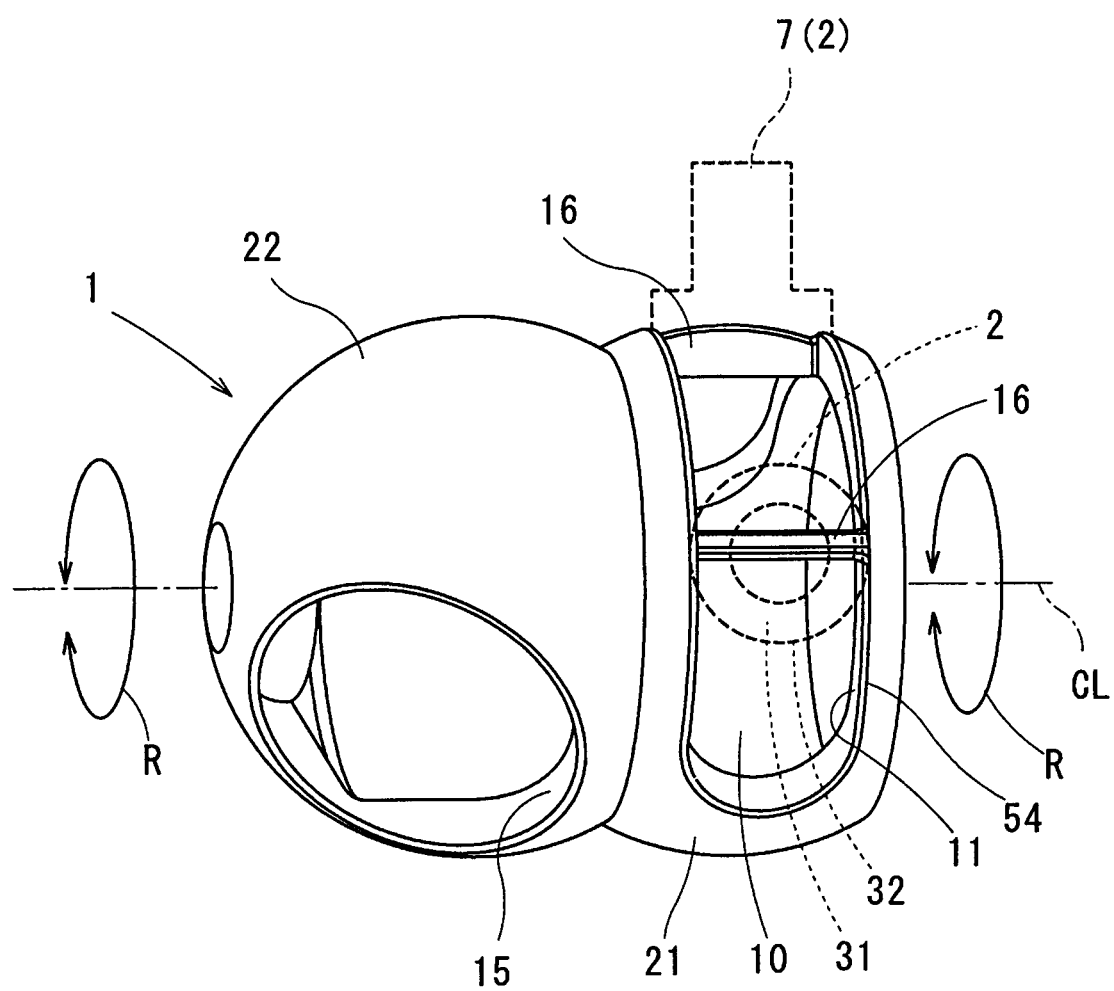
FIG. 3 is a perspective view illustrating a ball valve (according to the first embodiment).
Figure 4:
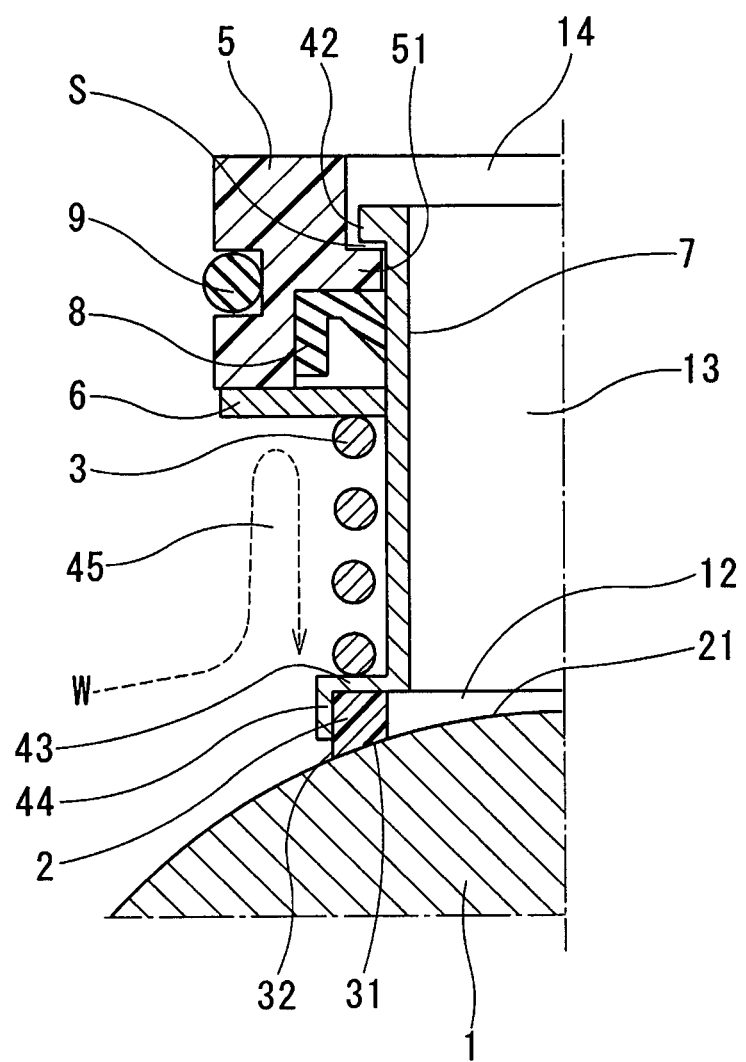
FIG. 4 is a sectional view illustrating the valve device at the valve closed time (according to the first embodiment).
Figure 5:
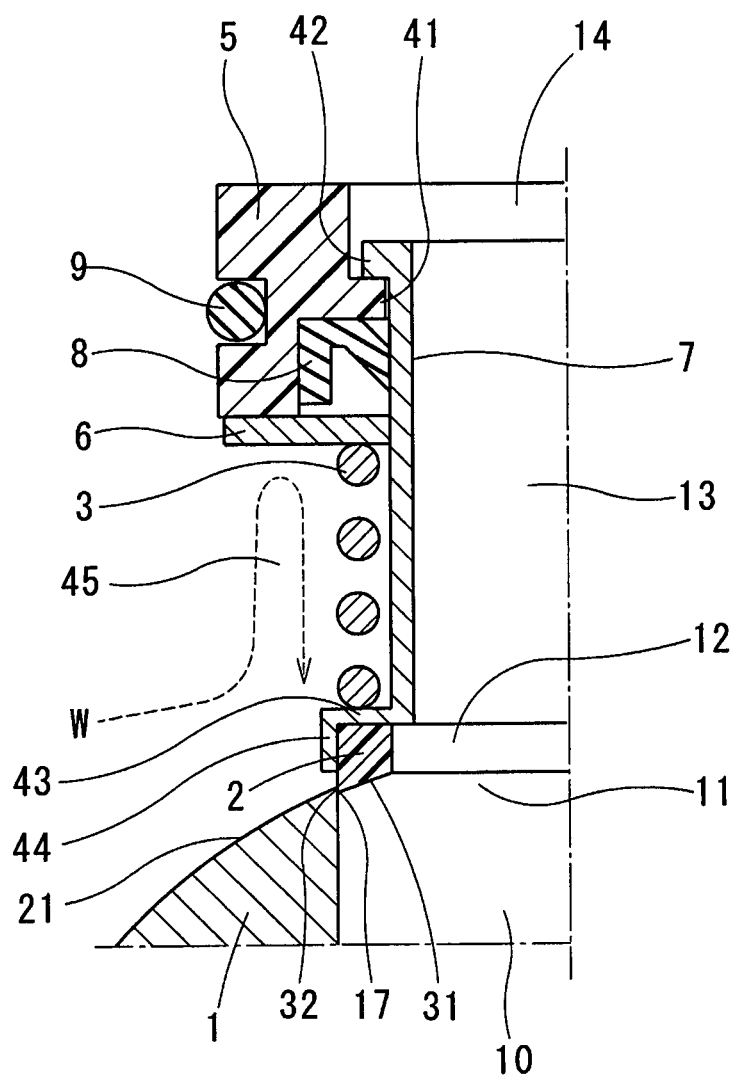
FIG. 5 is a sectional view illustrating the valve device at the valve opened time (according to the first embodiment).

The ball valve 1 includes a shaft (not shown) extending straightly in the rotation axis (CL) direction. As shown in FIG. 3, the ball valve 1 moves (rotates) both-way in a rotational direction shown in an arrow R with a center corresponding to the rotation axis (CL). The shaft is installed to pass through the ball valve 1 in the CL direction, and is connected with the ball valve 1 to be integrally rotatable. The shaft is supported to be rotatable relative to a housing 4 of the casing. The electric actuator has an electric motor which generates power driving the shaft of the ball valve 1 both-way (to rotate) in the rotational direction.

The casing includes a housing 5, a plate 6, a sleeve 7 in addition to the housing 4. The casing may be constructed with the housing 4 which accommodates the ball valve 1 rotatably, and the sleeve 7 opposing to be contact with a sleeve regulation part (to be mentioned later) of the housing 4, while the sleeve 7 is movable together with the valve seat 2 in a pressing load direction of the spring 3. That is, the casing includes at least the housing 4, 5 and the sleeve 7.

Moreover, a seal part 8 such as a lip seal is arranged between the sleeve 7 and the housing 5. A seal component 9 such as O ring is also arranged between the housing 4 and the housing 5.

A cooling-water passage 13, 14 is defined inside of the casing, and is located downstream of a seat opening 12 of the valve seat 2 in the flowing direction of cooling water. Further, the cooling-water passage 13, 14 is communicated to the valve opening 11 of the ball valve 1 through the seat opening 12. Moreover, a valve accommodation chamber is defined inside the casing to accommodate the ball valve 1 rotatably.

The ball valve 1 is made of, for example, synthetic resin (thermoplastic resin such as PPS), and has a surface in contact with at least the valve seat 2, e.g., a smooth ball surface 21 shaped in convex sphere surface. The ball valve 1 is rotated by the electric actuator through the shaft. The ball valve 1 is shaped in an approximately cup form as an example. Moreover, the ball valve 1 rotates around the rotation axis (CL) (refer to FIG. 3).

The flowing direction of cooling water is not limited, while the cooling water is supplied from the inlet to the cooling-water passage 10 inside the ball valve 1 through the cup opening, as an example, for easy understanding. When the ball valve 1 opens the passage, the cooling water supplied to the cooling-water passage 10 is introduced to the outlet through the valve opening 11, the seat opening 12, and the cooling-water passage 13, 14.

The ball valve 1 has plural (such as two or three) ball surfaces 21, 22 shaped in convex sphere surface protruding outward in a radial direction with a center corresponding to a predetermined rotation axis (center axis line of the shaft) CL, and is rotated by the electric actuator. The ball surface 21 corresponds to a first sliding surface to be in sliding contact with a sealing surface (second sliding surface) 31 of the valve seat 2. The valve opening 11 is defined in the ball surface 21 to extend in the circumference direction of the ball valve 1, and is able to communicate with the seat opening 12. The ball surface 22 corresponds to a third sliding surface to be in sliding contact with a sealing surface (fourth sliding surface) of the other valve seat (not shown) different from the valve seat 2. A valve opening 15 is defined in the ball surface 22, and is able to communicate with a seat opening (not shown) corresponding to a fourth opening of the other valve seat.

The valve opening 11 is a first opening opened in the ball surface 21 to allow the cooling water to pass through. The valve opening 11 is shaped in an oblong hole extending in the circumference direction of the ball surface 21. Moreover, a bridge 16 for reinforcement is provided in the valve opening 11 to connect the wall surfaces with each other through the opening. The valve opening 15 is a third opening shaped in a circle hole opened in the ball surface 22 to allow the cooling water to pass through. Moreover, a taper-shaped chamfering part 54 is formed at the opening peripheries of the valve opening 11 opposing in the CL direction of the ball valve 1. The chamfering part 54 has a slope surface to gradually increase the opening area of the valve opening 11 as heading outward in the radial direction of the ball valve 1.

The shaft is a driving shaft arranged to pass through an approximately central part of the valve accommodation chamber, and is supported through a bearing to be rotatable relative to the housing 4. The electric actuator which drives the shaft may have a known configuration. In this disclosed embodiment, the electric actuator includes an electric motor converting electric power to a rotation torque, a deceleration mechanism (for example, mechanical reduction gear) which slows down the rotation output of the electric motor to increase the drive torque of the shaft, and a noncontact rotation angle sensor which detects the rotation angle of the shaft (namely, operation angle of the ball valve 1).

The valve seat 2 is a ring disk board having the seat opening 12 through which cooling water passes at the central part. The seat opening 12 is the second opening to be communicated with the valve opening 11. The valve seat 2 is made of synthetic resin (such as PTFE) in order to reduce the manufacturing cost and in order to improve the sealing property at a valve closed time and the sliding property at an operation time.

The valve seat 2 has an annular opposing part opposing the ball surface 21 to be in sliding contact, and the opposing part is forced onto the ball surface 21 by the elastic force of the spring 3. The sealing surface 31 is formed in the opposing surface of the opposing part. Moreover, a surface (the upper side surface shown in FIG. 1 and FIG. 2) of the valve seat 2 opposite from the sealing surface 31 is a seat opposite surface.

The valve seat 2 is supported by the housing 4, and the housing 4 has means for supporting the valve seat 2, such as the spring 3, the housing 4, the housing 5, the plate 6, and the sleeve 7. The spring 3 is, for example, a compression coil spring arranged between the valve seat 2 and the housing 5, and is attached in the compressed state. An end of the spring 3 is held at the plate 6, and the other end is held at the seat holding part (to be mentioned later) of the sleeve 7. The spring 3 is an elastic component which generates the elastic force elastically pressing the valve seat 2 against the ball valve 1 in the load direction. The elastic force of the spring 3 is set in a manner that the valve seat 2 is pressed onto the ball valve 1 with a predetermined pressing load.

The cooling-water inlet is located at the upstream end of the housing 4. The cooling-water outlet is located at the downstream end of the housing 4. The housing 4 has an opening through which the ball valve 1 is inserted, and the valve accommodation chamber for accommodating the ball valve 1.

A case where the housing 4 is directly attached to an engine is explained. The housing 4 is directly attached to the engine (such as cylinder head), and the housing 4 is fixed to the engine. The opening of the housing 4 corresponds to the exit of the engine cooling water. The cooling water is supplied from the engine to the valve accommodation chamber inside the housing 4 (specifically, inner side of the ball valve 1) through the opening of the housing 4.

In case where the housing 4 is mounted independently from the engine, an inlet pipe is prepared for the housing 4 to introduce the cooling water from the engine to the valve accommodation chamber.

Moreover, an outlet pipe is fixed to the housing 4 to lead the cooling water to the exterior, after the flow rate is controlled in the valve device. The cooling water controlled in the flow rate with the valve device is introduced to a radiator, a heater core, and the like through a piping connected to the outlet pipe.

The housing 5 is a ring-shaped spacer fixed inside the housing 4, and is produced separately from the housing 4. The cooling-water passage 14 is formed inside the housing 5. The housing 5 may be, for example, a part of the outlet pipe which leads the cooling water passing through the valve seat 2 to the cooling-water outlet, or another component (such as cylindrical object) different from the outlet pipe.

The inner circumference of the housing 4, 5, especially the housing 5, has a sleeve regulation part (hereafter called as an inner circumference projection) 51 that is in contact with an engaging part (to be mentioned later) of the sleeve 7 to regulate the movement of the sleeve 7 toward the valve. Moreover, the sleeve 7 has the engaging part (hereafter called as an outer circumference projection) 42 opposing to be in contact with the inner circumference projection 51, and the outer circumference projection 42 is engaged with the inner circumference projection 51.

The plate 6 has a ring disk form and is arranged between the spring 3 and the housing 5. The plate 6 is a metal spring seat holding the end of the spring 3, and is produced separately from the housing 4, 5.

The sleeve 7 has the outer circumference projection 42 opposing to be in contact with or to be separated from the inner circumference projection 51, and the seat holding part (the ring board 43, the peripheral wall 44) holding the valve seat 2.

At the valve closed time of the ball valve 1, the outer circumference projection 42 is spaced from the inner circumference projections 51 through an annular clearance S. Moreover, at a valve opened time of the ball valve 1, the outer circumference projection 42 is in contact with and engaged with the inner circumference projection 51.

The sleeve 7 is a cylinder object which supports the valve seat 2 at one end (near the ball valve 1), and the other end is inserted into the housing 5. The cooling-water passage 13 is formed inside the sleeve 7, and introduces the cooling water passing through the seat opening 12 to the cooling-water passage 14.

Specifically, the sleeve 7 is made of metal material such as stainless steel excellent in corrosiveness-proof, but is not limited. As means for supporting the valve seat 2, the end of the sleeve 7 shaped in cylinder, which restrains the outer circumference surface of the valve seat 2, integrally has a ring board 43 in pressure-contact with the seat opposite surface.

The valve device of this embodiment is formed to intentionally introduce the pressure of cooling water (hereafter referred to as water pressure), at the valve closed time of the ball valve 1, to both sides (the sealing surface side and the seat opposite surface side) of the valve seat 2. Specifically, a back pressure space 45 is defined near the seat opposite surface, to which the cooling water is introduced from the inlet to the inside of the valve device (namely, inside of the housing 4).

Specifically, the back pressure space 45 is a space around the sleeve 7 where the spring 3 is arranged. In more details, the back pressure space 45 is a space surrounded by the plate 6, the sleeve 7, the ring board 43 and the passage wall in the housing 4 to be communicated to the outlet.

The back pressure space 45 is communicated to the space in the housing 4 which accommodates the ball valve 1 through a clearance between the housing 4 and the ring board 43. The space which accommodates the ball valve 1 is always communicated to the inlet. For this reason, as shown in a dashed arrow W in the drawings, the cooling water is introduced to the back pressure space 45 from the engine through the inlet.

The valve seat 2 of this embodiment has the sealing surface 31 and the seat contact surface 32.

When the ball valve 1 is rotated, the sealing surface 31 is in sliding contact with the ball surface 21 at the valve closed time of the ball valve 1 when the ball surface 21 and the seat opening 12 overlap with each other.

The seat contact surface 32 is formed on a surface different from the sealing surface 31. At a valve opened time of the ball valve 1 when the valve opening 11 and the seat opening 12 overlap with each other, the seat contact surface 32 is in sliding contact with the inner wall surface 17 of the valve opening 11.

Moreover, the valve device of this embodiment includes the spring 3, the housing 4, 5, and the sleeve 7.

The housing 5 has the inner circumference projection 51 in contact with the outer circumference projection 42 of the sleeve 7 to regulate movement of the sleeve 7 toward the valve. Moreover, the sleeve 7 has the outer circumference projection 42 opposing to be in contact with the inner circumference projection 51, and the outer circumference projection 42 is engaged with the inner circumference projection 51.

The seat holding part of the sleeve 7 is configured by the ring board 43 which fixes (junction or adhesion) the seat opposite surface of the valve seat 2, and the cylindrical peripheral wall 44 which fixes (junction, adhesion, press-fit, or plastically deforming fixation) the outer circumference surface of the valve seat 2. Namely, the sleeve 7 is connected with the valve seat 2, and is able to move integrally with the valve seat 2.

The sleeve 7 is a cylinder object opposing to be in contact with the inner circumference projection 51 of the housing 5, and moveable in the pressing load direction of the spring 3 together with the valve seat 2. The cooling-water passage 13 is defined inside the sleeve 7, and communicates with the seat opening 12 and the cooling-water passage 14.

The inner circumference projection 51 is formed on the inner circumference of the housing 5, and the outer circumference projection 42 is formed on the outer circumference of the sleeve 7. That is, the cylinder part of the sleeve 7 has a structure such as outer circumference recess portion recessed from the outer side inward in the radial direction than the outer circumference end surface of the outer circumference projection 42, to which the inner circumference projection 51 is fitted.

Moreover, at the valve closed time of the ball valve 1, since the ball surface 21 and the sealing surface 31 are in sliding contact, the sleeve 7 is moved away from the pressing load direction of the spring 3. Thereby, a clearance is generated between the upper end surface of the inner circumference projection 51 and the lower end surface of the outer circumference projection 42 in the pressing load direction of the spring 3, such that the inner circumference projection 51 and the outer circumference projection 42 are not in contact with each other. Moreover, at the valve closed time, the sleeve 7 can be displaced by the clearance in the pressing load direction of the spring 3.

In contrast, at a valve opened time of the ball valve 1, the ball surface 21 and the sealing surface 31 are not in the contact state. Since the valve seat 2 enters slightly inside the valve opening 11, the sleeve 7 moves in the pressing load direction of the spring 3. Thereby, the clearance between the upper end surface of the inner circumference projection 51 and the lower end surface of the outer circumference projection 42 is lost, such that the inner circumference projection 51 and the outer circumference projection 42 are in contact with each other. Therefore, the position of the valve seat 2 is fixed in the pressing load direction of the spring 3.

As mentioned above, in the valve device of this embodiment, the valve seat 2, which is pushed against the ball surface 21 of the ball valve 1 and the opening inner wall surface 17 of the valve opening 11 by the pressing load of the spring 3, has the sealing surface 31 and the seat contact surface 32.

At the valve closed time of the ball valve 1, the valve seat 2 is pushed against the ball valve 1 by the pressing load of the spring 3, such that the sealing surface 31 and the ball surface 21 of the valve seat 2 are in sliding contact. Namely, at the valve closed time of the ball valve 1, the ball surface 21 and the sealing surface 31 are in the contact state, and the clearance between the ball surface 21 and the sealing surface 31 can be liquid-tightly sealed.

On the other hand, at a valve opened time of the ball valve 1, the valve seat 2 is pushed against the ball valve 1 by the pressing load of the spring 3, and the inner circumference projection 51 and the outer circumference projection 42 are in contact with each other. Since the sealing surface 31 of the valve seat 2 is fixed in the state of entering inside of the valve opening 11, the seat contact surface 32 and the opening inner wall surface 17 of the valve opening 11 are in sliding contact. Namely, at a valve opened time of the ball valve 1, the sealing surface 31 and the ball surface 21 are in the non-contact state.

The seat contact surface 32 that is in sliding contact with the opening inner wall surface 17 of the valve opening 11 at a valve opened time of the ball valve 1 can be produced separately from the sealing surface 31 that is in sliding contact with the ball surface 21 at the valve closed time of the ball valve 1, such that wear of the sealing surface 31 of the valve seat 2 can be reduced. Thereby, cooling water becomes difficult to leak between the ball surface 21 and the sealing surfaces 31. The seal performance for cooling water at the valve closed time of the ball valve 1 can be secured over a long period of time. Therefore, the wear-resistant improvement in the sealing surface 31 of the valve seat 2 and the improvement of reliability to prevent leak of cooling water become compatible.

Moreover, at a valve opened time of the ball valve 1, while the sealing surface 31 of the valve seat 2 is forced onto the ball valve 1 by the pressing load of the spring 3, the ball surface 21 and the sealing surface 31 are in the non-contact state. Therefore, wear of the sealing surface 31 can be reduced, and the contact surface area between the ball surface 21 and the sealing surface 31 does not increase.

Since the contact surface pressure of the sealing surface 31 over the ball valve 1 is secured, the cooling water becomes difficult to leak from the seal part of the ball surface 21 and the sealing surface 31, and the seal performance for the cooling water at the valve closed time of the ball valve 1 is securable over a long period of time. Therefore, since a fixed contact surface pressure can be uniformly maintained irrespective to wear of the valve seat 2, the wear-resistant improvement in the sealing surface 31 of the valve seat 2, and the improvement of reliability to prevent leak of cooling water become compatible.

Figure 6:
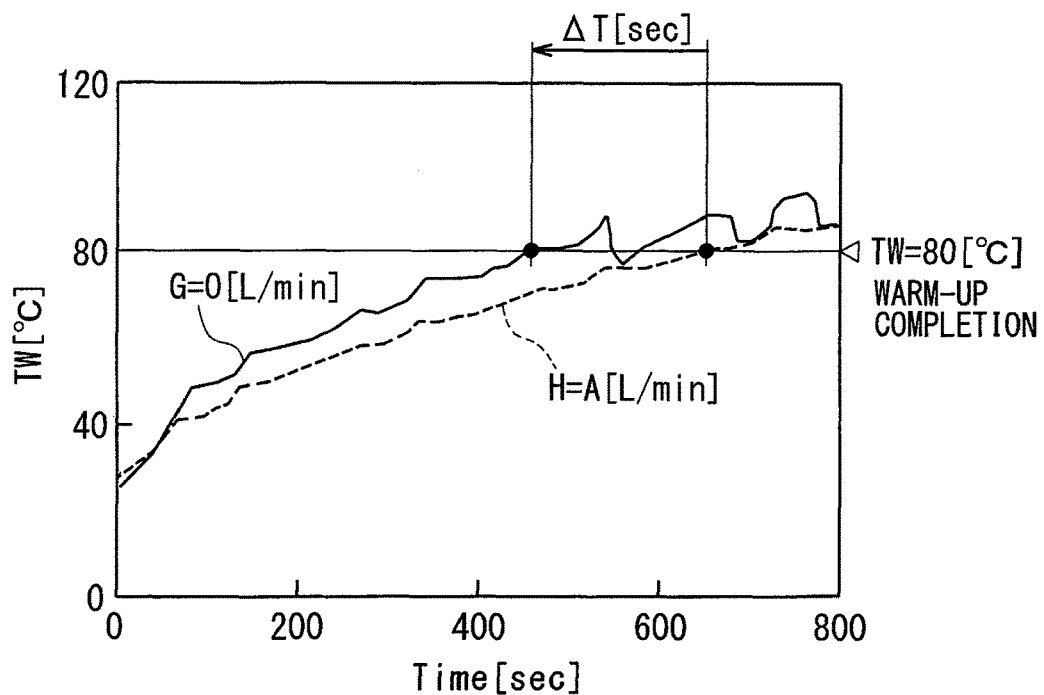
FIG. 6 is a timing chart illustrating change in water temperature inside an engine at an engine start time (according to the first embodiment).

In FIG. 6, the vertical axis represents the average value [° C.] of the engine internal water temperature TW, and the horizontal axis represents the lapsed time Time [sec] after the engine is started. In addition, G represents a change in the leak flow rate of the cooling water of the first embodiment, and H represents a change in the leak flow rate of the cooling water of a comparative example (system without the valve device of the first embodiment).

Figure 7:
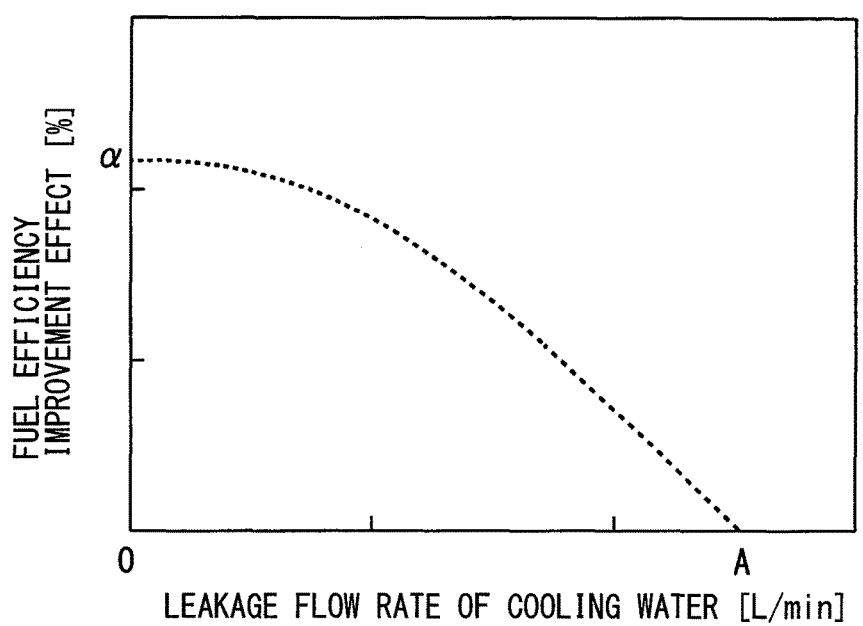
FIG. 7 is a graph illustrating a relationship between a leakage flow rate of engine cooling water and a fuel efficiency improvement effect (according to the first embodiment).

In FIG. 7, the vertical axis represents a fuel efficiency improvement effect [%], and the horizontal axis represents a leakage flow rate [L/min] of the cooling water.

According to the valve device of this embodiment, at a valve opened time of the ball valve 1, the seat contact surface 32 and the opening inner wall surface 17 are in contact with each other, and the ball surface 21 and the sealing surface 31 are made in the non-contact, such that wear of the sealing surface 31 can be controlled.

When such valve device is used for flow control of engine cooling water, as shown in FIG. 6 and FIG. 7, the leak flow rate of the cooling water at the valve closed time of the ball valve 1 can be reduced from A (for example, 25-35 [L/min]) in the conventional example to 0 [L/min] according to the first embodiment, such that high seal performance can be maintained for a long period of time.

That is, if the seal performance is maintainable over a long period of time, the fuel efficiency improvement effect: α % or more can be attained to improve the reliability.

The fuel efficiency improvement effect: α % means that the fuel efficiency improves by α %, if the time period from the engine start to the warm-up completion becomes short by ΔT seconds, compared with the comparative example.

Moreover, the warm-up operation of the engine is performed, immediately after the engine is started, to raise the engine internal water temperature (TW) to a proper temperature (for example, internal water temperature: TW=80 [° C.]) while the operational status such as the engine rotation speed and the engine load is suppressed for a predetermined period of time. That is, the time period from the engine start to the warm-up completion means a period from when the engine is put in operation to when the engine internal water temperature is raised to the proper temperature.

[Second Embodiment]

Figure 8:
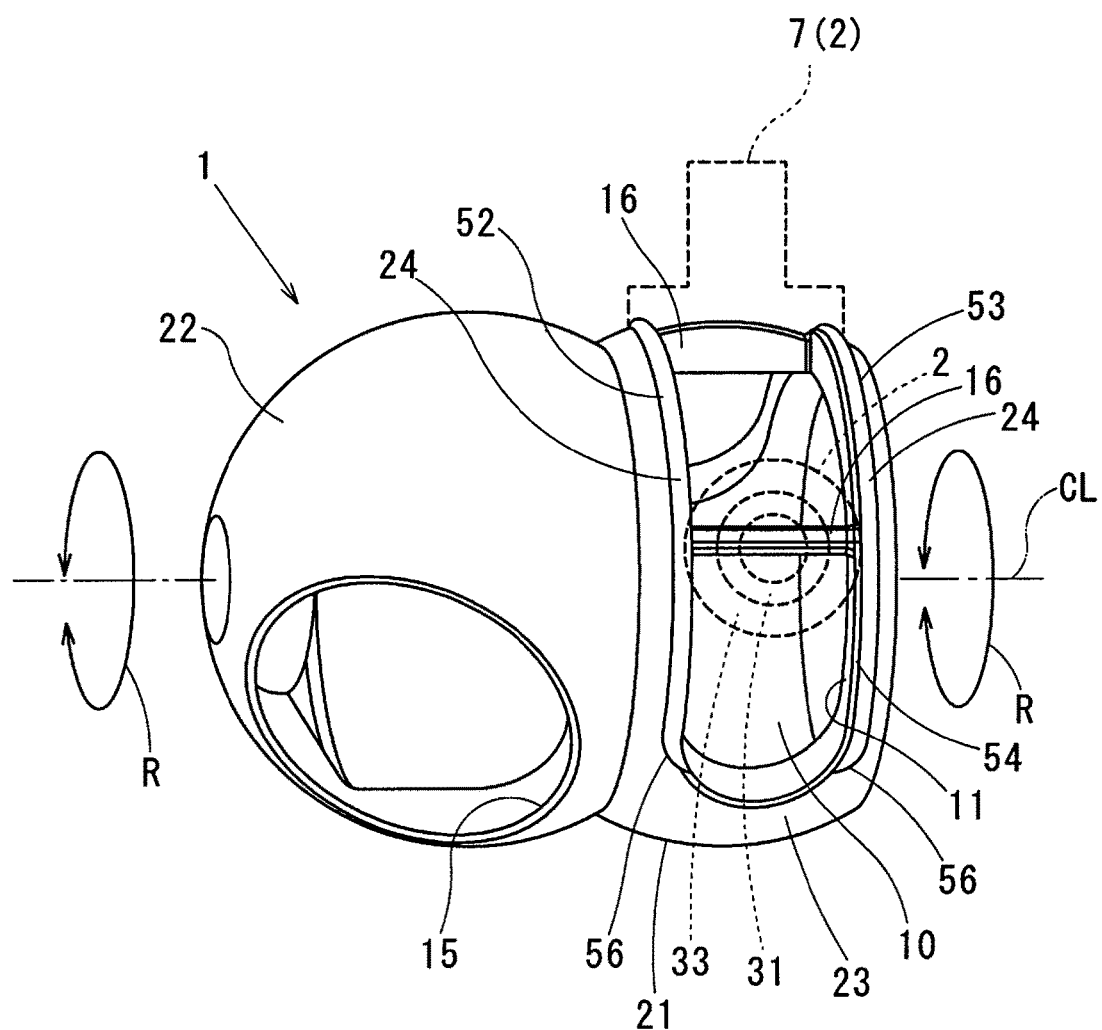
FIG. 8 is a perspective view illustrating a ball valve (according to a second embodiment).
Figure 9:
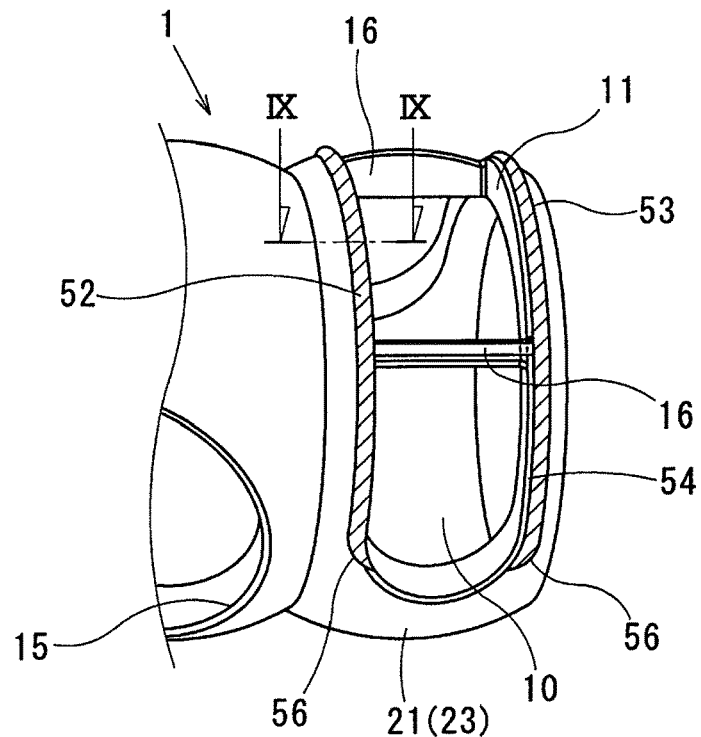
FIG. 9(a) is an enlarged view of FIG. 8.
FIG. 9(b) is a cross-sectional view taken along a line IX-IX of FIG. 9(a) (according to the second embodiment).
Figure 9:
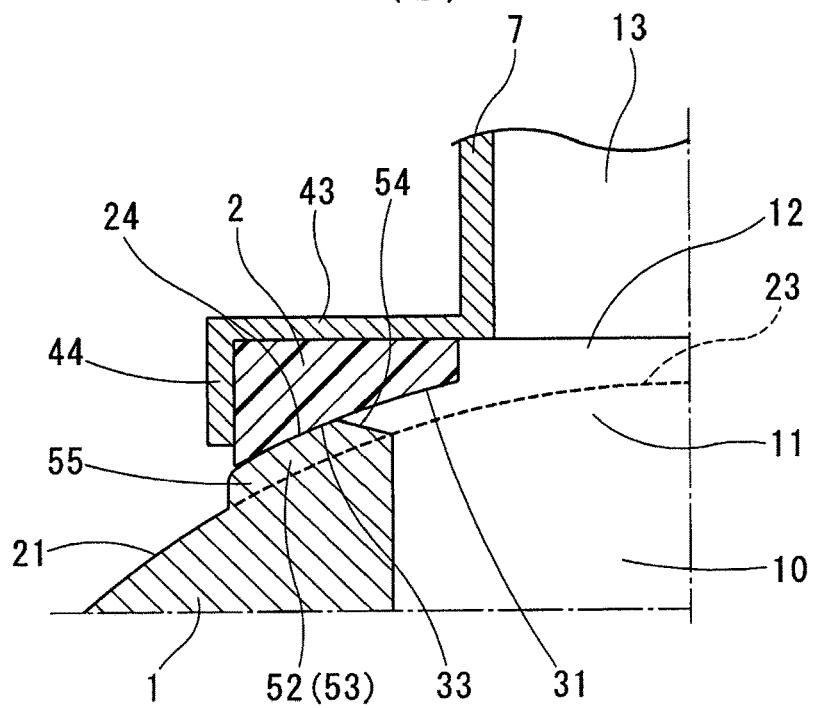

FIG. 8 and FIG. 9 illustrate a valve device (according to a second embodiment). The same mark as the first embodiment represents the same configuration or function, and the explanation is omitted.

The valve device of this embodiment includes, similarly to the first embodiment, the ball valve 1 shaped in multiple-surface sphere, the valve seat 2 shaped in ring, the spring 3, and the casing.

The casing includes at least the housing 4, 5 and the cylindrical sleeve 7.

The ball surface 21 of the ball valve 1 integrally has a ridge part 52, 53 along a pair of opening peripheries extending in the rotational direction of the valve opening 11. The ridge part 52, 53 is a valve convex part projected outward in the radial direction than a ball reference surface 23 of the ball surface 21.

The taper-shaped chamfering part 54 is formed along the opening periphery of the ridge part 52, 53 adjacent to the valve opening 11 in the CL direction. The taper-shaped chamfering part 55 is formed along the opening periphery of the ridge part 52, 53 on the side opposite from the valve opening 11 in the CL direction. The chamfering part 54 has a slope surface more gentle than that of the chamfering part 55. The opening area of the valve opening 11 is gradually increased as heading outward in the radial outside of the ball valve 1 in the slope surface of the chamfering part 54.

The taper-shaped chamfering part 56 is formed at the both ends of the ridge part 52, 53 in the rotational direction. The chamfering part 56 has a slope surface inclined upward from the ball reference surface 23 toward the peak surface of the ridge part 52, 53.

The ball surface 21 has the ball reference surface 23 flush with the outer circumference surface (convex sphere surface other than the ridge part 52, 53) of the ball valve 1. Moreover, the valve seat 2 has the ball contact surface 24 flush with the peak surface of the ridge part 52, 53 of the ball valve 1.

At the valve closed time of the ball valve 1, the sealing surface 31 is in sliding contact with the ball reference surface 23.

The ball contact surface 24 is shaped in the convex sphere surface protruding outward in the radial direction with the center corresponding to the rotation axis (CL) of the ball valve 1, and is located at the position projected on the outer side in the radial direction than the ball reference surface 23. The ball contact surface 24 is an opening end surface of the valve opening 11, and is projected away from the pressing load direction of the spring 3 relative to the ball reference surface 23.

At the valve closed time of the ball valve 1, the sealing surface 31 of the valve seat 2 is pushed against the ball surface 21 by the elastic force of the spring 3, and the annular sealing surface 31 is in sliding contact with the ball reference surface 23 of the ball surface 21.

The annular seat contact surface 33 is defined on the outer side of the sealing surface 31 in the radial direction. At an opened time of the ball valve 1, the seat contact surface 33 is pushed against the ball valve 1 by the elastic force of the spring 3, and is in sliding contact with the ball contact surface 24. The seat contact surface 33 is formed to surround the sealing surface 31 in the circumferential direction.

When closing the passage with the ball valve 1, the valve seat 2 moves in the pressing load direction of the spring 3, and the ball reference surface 23 and the sealing surface 31 are in sliding contact. At this time, the clearance between the upper end surface of the inner circumference projection 51 and the lower end surface of the outer circumference projection 42 becomes the narrowest.

At the valve closed time, the valve seat 2 and the sleeve 7 can displace by a predetermined distance in the pressing load direction of the spring 3.

At the valve closed time, the sealing surface 31 of the valve seat 2 is forced on the ball valve 1 by the pressing load of the spring 3, such that the ball reference surface 23 and the sealing surface 31 are in the contact state. Therefore, the clearance between the ball surface 21 and the sealing surface 31 can be liquid-tightly sealed.

In contrast, when opening the passage with the ball valve 1, the valve seat 2 moves upward from the ball reference surface 23 through the chamfering part 56 onto the ball contact surface 24. Therefore, the ball contact surface 24 and the seat contact surface 33 are in sliding contact, and the ball reference surface 23 and the sealing surface 31 are in the non-contact state. At this time, the sealing surface 31 is located on the inner side than the inner wall surface of the valve opening 11.

Moreover, the ball contact surface 24 and the seat contact surface 33 are in contact with each other. For this reason, the position of the valve seat 2 is fixed in the pressing load direction of the spring 3.

Therefore, in order to raise the wear resistance of the sealing surface 31 of the valve seat 2, the sealing surface 31 in sliding contact with the ball reference surface 23 of the ball surface 21 at the valve closed time of the ball valve 1 is separated from the seat contact surface 33 in sliding contact with the ball contact surface 24 at a valve opened time of the ball valve 1, such that wear of the sealing surface 31 of the valve seat 2 can be reduced.

As mentioned above, in the valve device of this embodiment, the same effect as the first embodiment is achieved.

[Third Embodiment]

Figure 10:
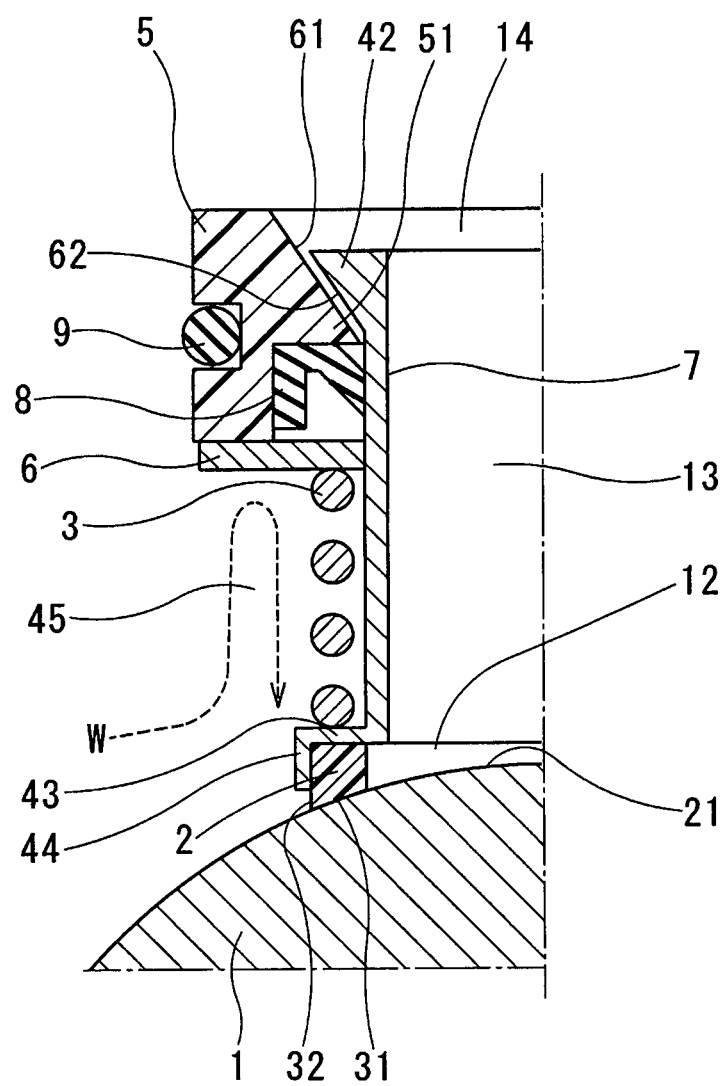
FIG. 10 is a sectional view illustrating a valve device at a valve closed time (according to a third embodiment).
Figure 11:
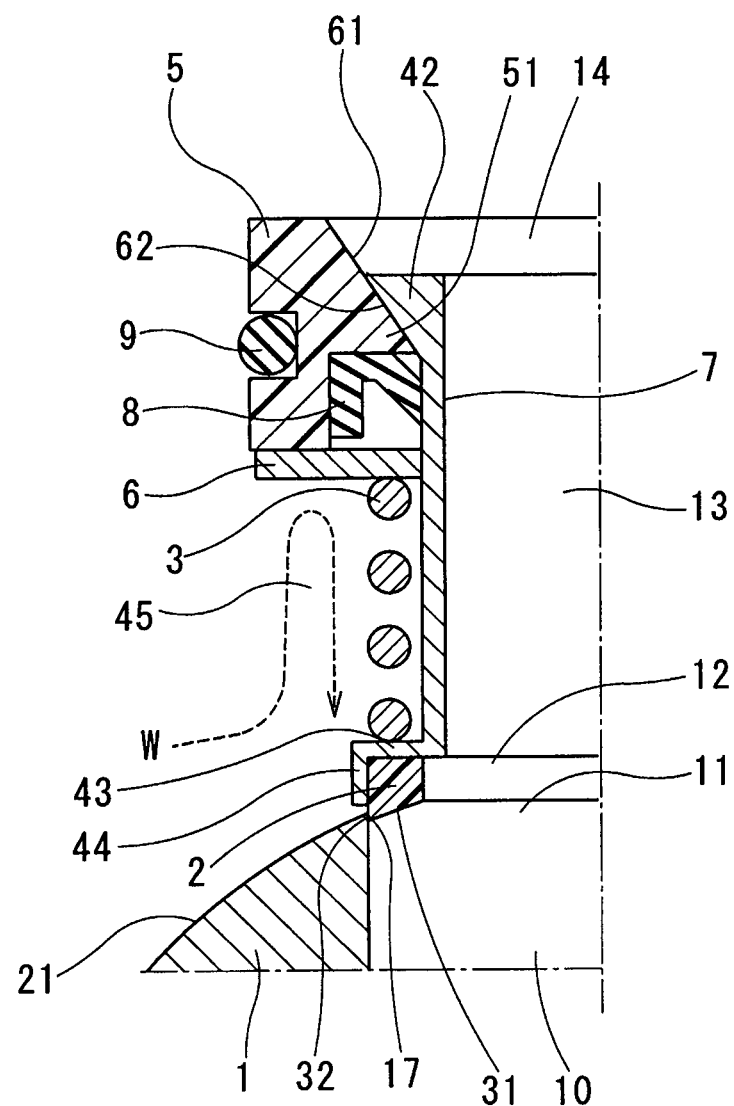
FIG. 11 is a sectional view illustrating the valve device at a valve opened time (according to the third embodiment).

FIG. 10 and FIG. 11 illustrate a ball type rotary valve device (according to a third embodiment). The same mark as the first and second embodiments represents the same configuration or function, and the explanation is omitted.

The housing 5 of this embodiment has an inner circumference projection 51 in contact with an outer circumference projection 42 of the sleeve 7 to regulate the movement of the sleeve 7.

The sleeve 7 has the outer circumference projection 42 opposing to be in contact with the inner circumference projection 51, and the outer circumference projection 42 is engaged with the inner circumference projection 51.

The inner circumference projection 51 has a slope surface 61 inclined to the pressing load direction of the spring 3, and the outer circumference projection 42 has a slope surface 62 inclined to the pressing load direction of the spring 3.

The slope surface 61 is a cone surface in which the passage cross-section area of the cooling-water passage 14 gradually decreases from the upper end of the housing 5 toward the lower end.

The slope surface 62 is a cone surface in which the amount of projection of the outer circumference projection 42 gradually decreases from the upper end of the sleeve 7 toward the lower end.

In the valve device of this embodiment, the same effect as the first and second embodiments is achieved.

Since the opposing surfaces of the inner circumference projection 51 and the outer circumference projection 42 are inclined, the displacement of the valve seat 2 and the sleeve 7 in the horizontal direction (left-right direction) can be restrained. Further, at a valve opened time of the ball valve 1, the ball surface 21 and the sealing surface 31 can be restricted from having the sliding contact due to the engine vibration or the vehicle vibration. Thereby, wear of the ball surface 21 and the sealing surface 31 can be controlled.

[Fourth Embodiment]

Figure 12:
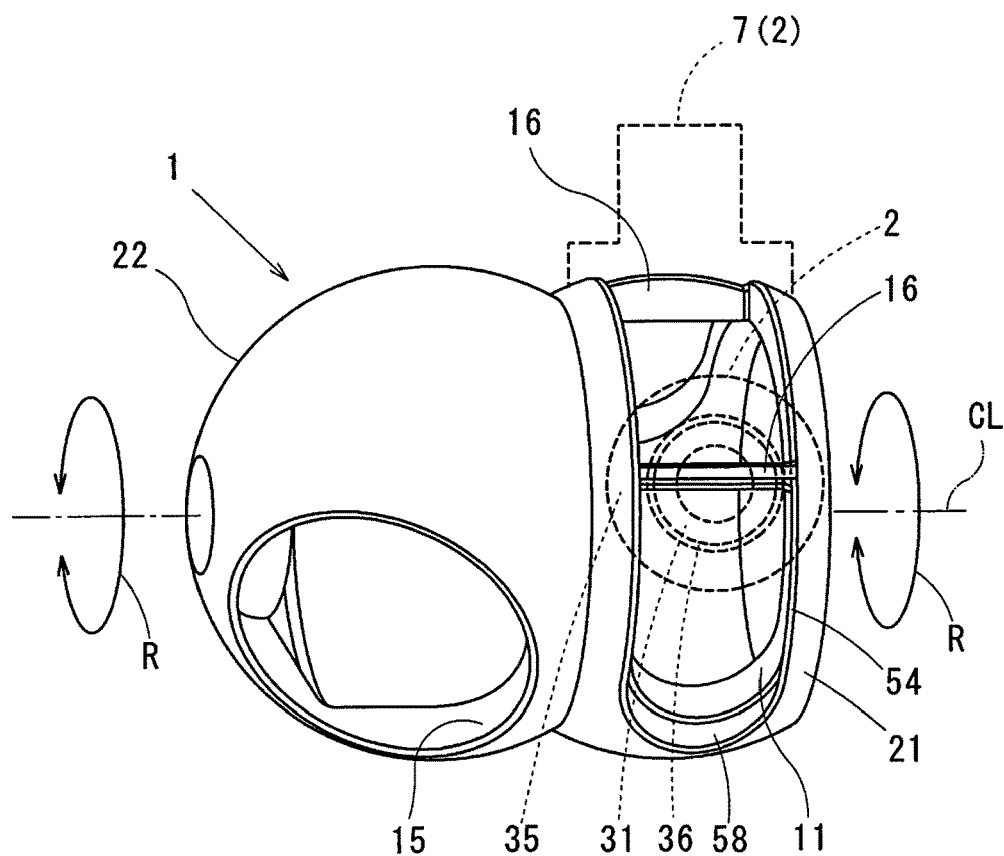
FIG. 12(a) is a perspective view illustrating a ball valve.
FIG. 12(b) is an enlarged view illustrating a valve device (according to a fourth embodiment).
Figure 12:
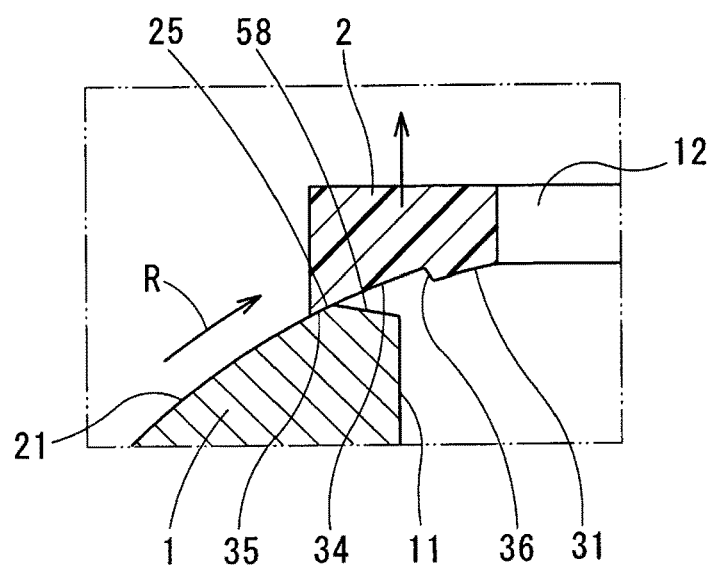
Figure 13:
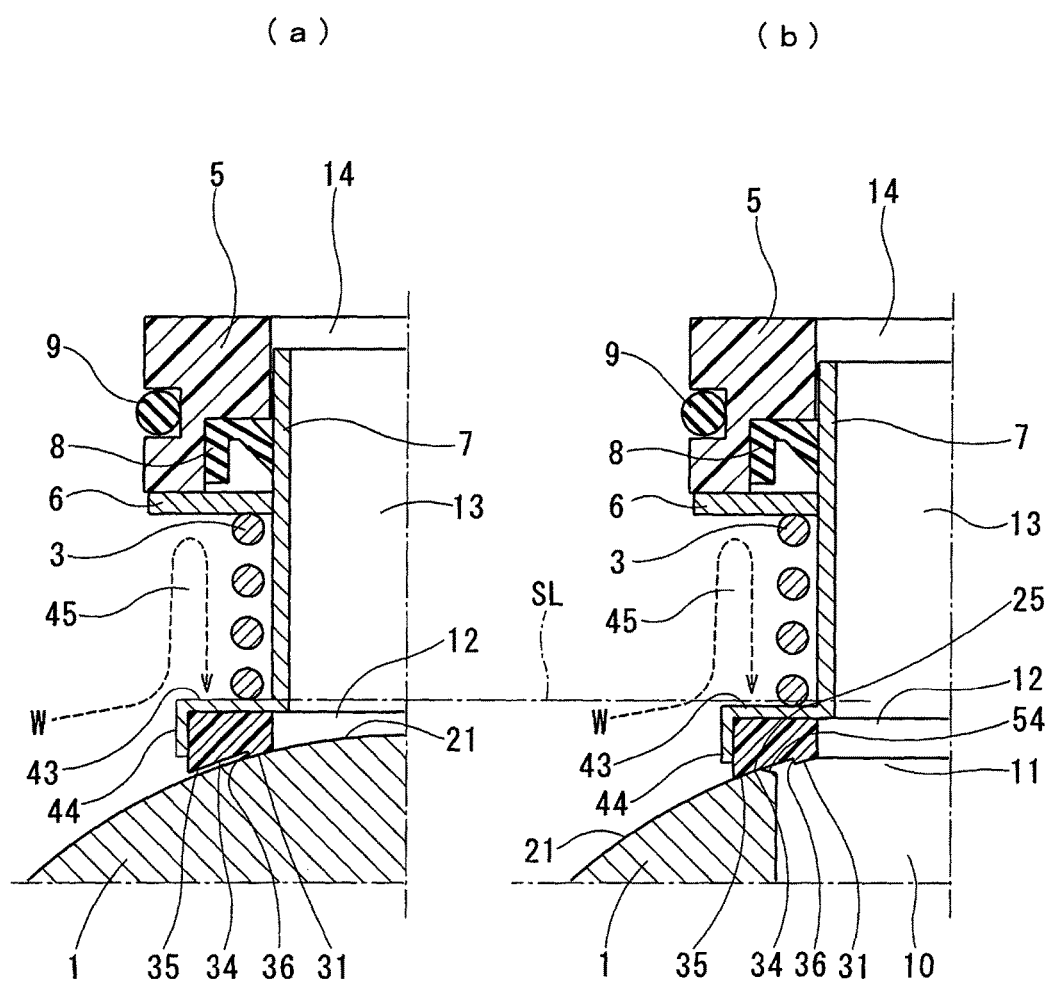
FIG. 13(a) is a sectional view illustrating the valve device at a valve closed time and FIG. 13(b) is a sectional view illustrating the valve device at a valve opened time (according to the fourth embodiment).

FIG. 12 and FIG. 13 illustrate a valve device (according to a fourth embodiment). The same mark as the first, second and third embodiments represents the same configuration or function, and the explanation is omitted.

The valve device of this embodiment includes the ball valve 1 shaped in multiple-surface sphere, the valve seat 2 shaped in ring, the spring 3, and the casing, similarly to the first embodiment.

The casing includes at least the housing 4, 5 and the cylindrical sleeve 7.

The ball valve 1 has the ball surface 21 and the ball contact surface 25.

The ball contact surface 25 is an opening end surface of the valve opening 11, and is defined along the opening periphery of the valve opening 11. At a valve opened time of the ball valve 1, the seat contact surface 35 is in sliding contact with the ball contact surface 25.

The taper-shaped chamfering part 54 is formed along the opening periphery adjacent to the valve opening in the CL direction of the ball valve 1.

Moreover, the taper-shaped chamfering part 58 is formed at the both ends of the valve opening 11 in the rotational direction of the ball valve 1. Each of the chamfering parts 58 has an arc shape along the opening periphery of the valve opening 11, and has a slope surface inclined upward to the opening end of the valve opening 11. That is, the chamfering part 58 is formed in the taper shape in a manner that the valve seat 2 moves smoothly upward from the valve opening 11 onto the ball surface 21 when closing the passage with the ball valve 1.

The valve seat 2 has an annular seat recess portion 34 located on the outer side of the annular sealing surface 31 in the radial direction. The seat recess portion 34 is recessed away from the pressing load direction of the spring 3.

An annular seat contact surface 35 is formed on the outer side of the seat recess portion 34 in the radial direction, and opposes the ball surface 21 to be in sliding contact. The seat contact surface 35 is forced on the ball surface 21 by the elastic force of the spring 3.

The seat contact surface 35 is connected with the sealing surface 31 through an annular step part 36. The seat contact surface 35 is formed to surround the circumference of the sealing surface 31 in the circumferential direction. The seat contact surface 35 is in sliding contact with the ball contact surface 25 at a valve opened time of the ball valve 1, and is in a non-contact state relative to the ball surface 21 at the valve closed time of the ball valve 1.

The position of the seat contact surface 35 at the valve closed time of the ball valve 1 is located upper than the position of the seat contact surface 35 at a valve opened time, with respect to a reference line SL shown in a single chain line in the drawing. The reference line SL represents the position of the ring board 43 which holds the valve seat 2 in practice. That is, at a valve opened time of the ball valve 1, the ring board 43 is located lower than the reference line SL.

The sealing surface 31 is arranged on the inner side of the seat recess portion 34 in the radial direction. The sealing surface 31 is defined along the opening periphery of the seat opening 12. The sealing surface 31 is projected in the pressing load direction of the spring 3, compared with the seat contact surface 35. The sealing surface 31 is in sliding contact with the ball surface 21 at the valve closed time of the ball valve 1, and is in a non-contact state relative to the ball surface 21 and the ball contact surface 25 at a valve opened time of the ball valve 1.

In the valve device, the housing 5 does not have an inner circumference projection, and the sleeve 7 does not have an outer circumference projection. Thereby, the positions of the valve seat 2 and the sleeve 7 are fixed on the lower side when the ball surface 21 is in contact with the seat contact surface 35 (in the valve opened state), compared with a case where the ball surface 21 is in contact with the sealing surface 31 (in the valve closed state).

Therefore, at a valve opened time, the valve seat 2 is fixed in the state where the sealing surface 31 enters inside of the valve opening 11 while the ball surface 21 regulates the movement of the valve seat 2 and the sleeve 7. That is, the ball surface 21 functions as a seat regulation part in contact with the valve seat 2 to regulate the movement of the valve seat 2 and the sleeve 7.

When closing the passage with the ball valve 1, the sealing surface 31 moves onto the ball surface 21, such that the valve seat 2 moves in the pressing load direction of the spring 3. That is, the valve seat 2 moves in an arrow direction (upward) shown in FIG. 12 (*b*).

Moreover, at the valve closed time of the ball valve 1, the sealing surface 31 is forced on the ball valve 1 by the pressing load of the spring 3. Therefore, the ball surface 21 and the sealing surface 31 are in the contact state, and the clearance between the ball surface 21 and the sealing surface 31 is liquid-tightly sealed.

Moreover, at the valve closed time of the ball valve 1, since the ball surface 21 and the sealing surface 31 are in contact with each other, the valve seat 2 and the ring board 43 of the sleeve 7 are fixed on the upper side, compared with the valve opened time.

In contrast, when the ball valve 1 is operated to open, the sealing surface 31 of the valve seat 2 enters the valve opening 11 through the chamfering part 58 from the ball surface 21. The ball contact surface 25 and the seat contact surface 35 are in sliding contact with each other, and the ball surface 21 and the sealing surface 31 are in the non-contact state. At this time, the sealing surface 31 is located on the inner side than the inner wall surface of the valve opening 11. Moreover, the ball contact surface 25 and the seat contact surface 35 are in contact with each other. For this reason, the position of the valve seat 2 is fixed in the pressing load direction of the spring 3.

When the ball valve 1 is operated to close, since the sealing surface 31 of the valve seat 2 moves upward onto the ball surface 21 through the chamfering part 58 from the valve opening 11, the ball surface 21 and the sealing surface 31 are in sliding contact with each other, and the ball contact surface 25 and the seat contact surface 35 are in the non-contact state.

Therefore, in order to raise the wear resistance of the sealing surface 31, the sealing surface 31 in sliding contact with the ball surface 21 at the valve closed time of the ball valve 1 is separated from the seat contact surface 35 in sliding contact with the ball contact surface 25 at the valve opened time of the ball valve 1, such that wear of the sealing surface 31 can be reduced.

As mentioned above, in the ball type rotary valve of this embodiment, the same effect as the first, second and third embodiments is generated.

[Modification]

The ball valve is used as an example of a rotating-type valve in the embodiment, but is not limited. For example, the present disclosure may be applied to a rotary valve with an outer circumference surface shaped in convex sphere surface.

In this embodiment, fluid (cooling water in the embodiment) flows from the inner side to the outer side of a rotating-type valve (ball valve in the embodiment) at a valve opened time, but fluid may flow in the reverse direction.

In this embodiment, the ball valve is rotated by an electric actuator, but the means for driving the ball valve is not limited.

In this embodiment, the sleeve and the valve seat are fixed by press-fitting, but the joint means is not limited. For example, adhesive and the like may be used as the joint means.

In this embodiment, the compression coil spring is used as an example of a spring. Alternatively, the other spring such as bellows having a spring function relative to a ball valve or rubber component may be used.

In this embodiment, the present disclosure is applied to the valve device which controls the engine cooling water. Alternatively, the present disclosure may be applied to a valve device which controls cooling water of a vehicle not having an engine.

In this embodiment, the present disclosure is applied to the valve device which controls liquid (such as cooling water), but the fluid is not limited to liquid. The present disclosure may be applied to a valve device which controls gas (gases).

The invention claimed is:

1. A valve device comprising:
a valve having a ball surface having a convex spherical shape protruding outward in a radial direction with a center corresponding to a predetermined rotation axis, and a first opening opened in the ball surface to allow fluid to pass through; and
a seat having an annular shape, opposing the ball surface and in sliding contact with the ball surface, the seat being pressed against the ball surface, the seat having a second opening able to communicate with the first opening, wherein the valve is configured to move both ways in a rotational direction to perform at least open and close operations, wherein
the seat has
a sealing surface in sliding contact with the ball surface at a valve closed position where the ball surface and the second opening overlap with each other, and
a seat contact surface in sliding contact with an opening inner wall surface or an opening end surface of the first opening at a valve opened position when the first opening and the second opening overlap with each other, the opening end surface being immediately adjacent to the first opening;
the first opening includes a chamfer immediately adjacent the opening end surface; and
the seat contact surface is not in contact with the ball surface at the valve closed position.

2. The valve device according to claim 1, further comprising:
an elastic component to generate an elastic force that elastically presses the seat against the valve in a pressing load direction;
a housing that receives the valve in a rotatable manner; and
a sleeve having a pipe shape movable in the pressing load direction of the elastic component together with the seat, the sleeve having a holding part holding the seat, wherein
the housing has a regulation part in contact with the sleeve to regulate movement of the sleeve in the pressing load direction.

3. The valve device according to claim 2, wherein
the sleeve has an engaging part opposed to the regulation part and engaged with the regulation part, and
each of the regulation part and the engaging part has a slope surface inclined to the pressing load direction of the elastic component.

4. The valve device according to claim 1, further comprising:
an elastic component to generate an elastic force that elastically presses the seat against the valve in a pressing load direction, wherein
the seat has a recess portion recessed opposite to the pressing load direction and located radially outward of the sealing surface.

5. The valve device according to claim 1, further comprising:
an elastic component to generate an elastic force that elastically presses the seat against the valve in a pressing load direction, wherein
the ball surface has a ball reference surface in sliding contact with the sealing surface at the valve closed position,
the opening end surface of the first opening is a ball contact surface in sliding contact with the seat contact surface at the valve opened position,
the ball contact surface is projected from the ball reference surface away from the pressing load direction of the elastic component, and
the seat contact surface surrounds a circumference of the sealing surface in a circumferential direction.

6. The valve device according to claim 1, further comprising:
an elastic component to generate an elastic force that elastically presses the seat against the valve in a pressing load direction, wherein
the opening end surface of the first opening is a ball contact surface defined along an opening periphery of the first opening,
the sealing surface is projected from the seat contact surface in the pressing load direction of the elastic component, the sealing surface being in sliding contact with the ball surface at the valve closed position, and
the seat contact surface surrounds a circumference of the sealing surface in a circumferential direction, the seat contact surface being in sliding contact with the ball contact surface at the valve opened position.

7. The valve device according to claim 1, wherein
the valve has a chamfer along an opening periphery of the first opening.

8. The valve device according to claim 1, wherein
the valve is chamfered at both ends of the first opening in the rotational direction.

9. The valve device according to claim 1, wherein
the sealing surface is not in contact with the opening inner wall surface and the opening end surface at the valve opened position.

10. The valve device according to claim 1, wherein the opening end surface is a part of the ball surface.

11. The valve device according to claim 1, wherein all of the chamfer is interior to a spherical radius defined by the ball surface.

* * * * *